2 Sheets—Sheet 1.

A. H. FESSENDEN,

Assignor, by mesne assignments, to G. W. BROWN.

Corn-Planter.

No. 9,044. Reissued Jan. 13, 1880.

Witnesses
Fred. G. Dieterich
Jno. P. Brooks.

Inventor
Albert H. Fessenden
per: W. B. Richards
Atty.

N. PETERS, PHOTO-LITHOGRAPHER, WASHINGTON, D. C.

2 Sheets—Sheet 2.

A. H. FESSENDEN,

Assignor, by mesne assignments, to G. W. BROWN.

Corn-Planter.

No. 9,044. Reissued Jan. 13, 1880.

Witnesses
Jno. G. Dieterich
Jno. P. Brooks.

Inventor
Albert H. Fessenden
per W. B. Richards.
Atty

N. PETERS, PHOTO-LITHOGRAPHER, WASHINGTON, D. C.

UNITED STATES PATENT OFFICE.

ALBERT H. FESSENDEN, OF PORTER, WISCONSIN, ASSIGNOR, BY MESNE ASSIGNMENTS, TO GEORGE W. BROWN, OF GALESBURG, ILLINOIS.

CORN-PLANTER.

SPECIFICATION forming part of Reissued Letters Patent No. 9,044, dated January 13, 1880.

Original No. 210,845, dated December 17, 1878. Application for Reissue filed October 23, 1879.

*To all whom it may concern:*

Be it known that I, ALBERT H. FESSENDEN, of Porter, in the county of Rock and State of Wisconsin, have invented certain new and useful Improvements in Corn-Planters; and I do hereby declare that the following is a full, clear, and exact description of the invention, that will enable others skilled in the art to which it appertains to make and use the same, reference being had to the accompanying drawings, and to the letters of reference marked thereon, which form a part of this specification, in which—

Figure 1:
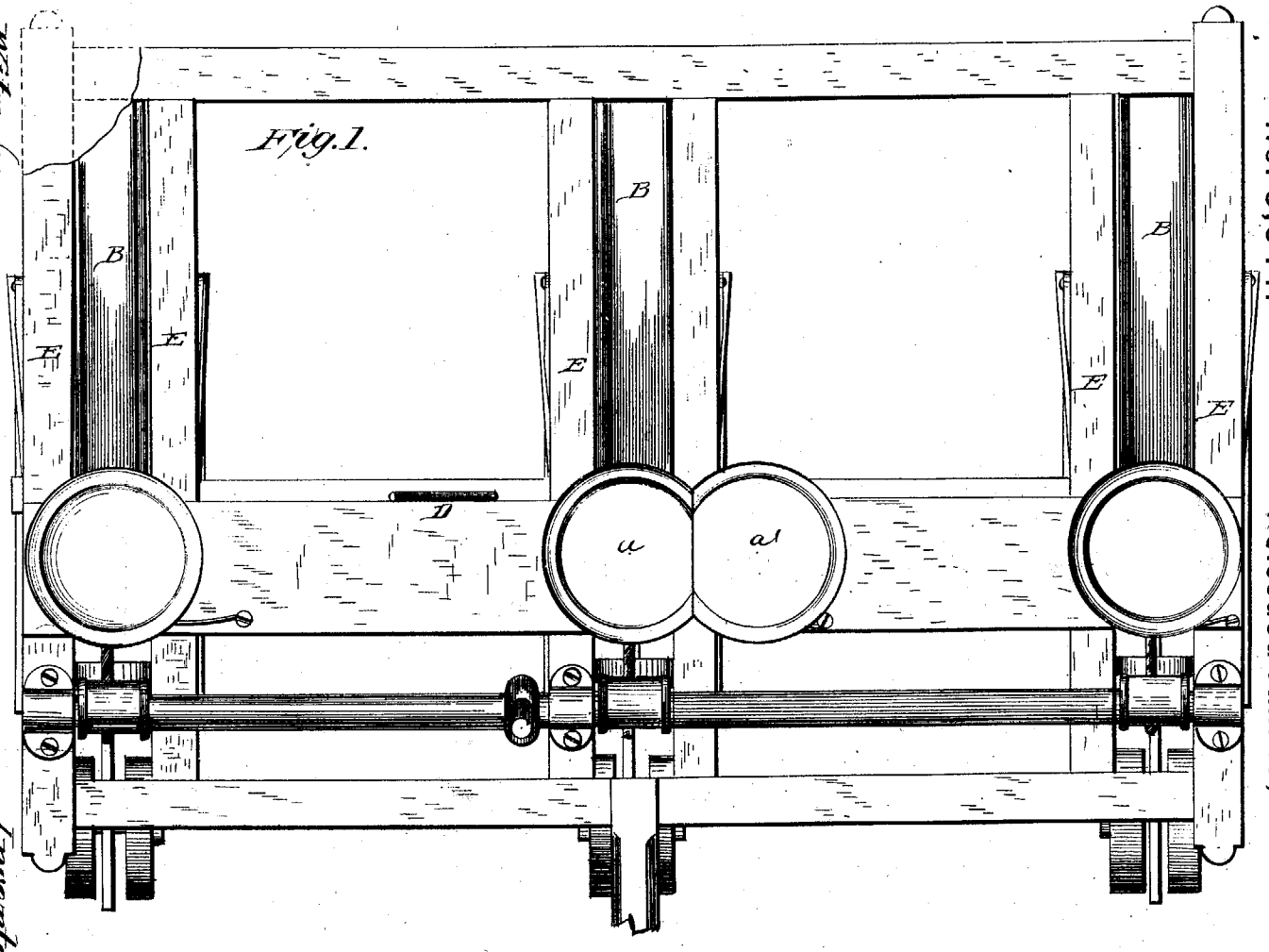
Figure 2:
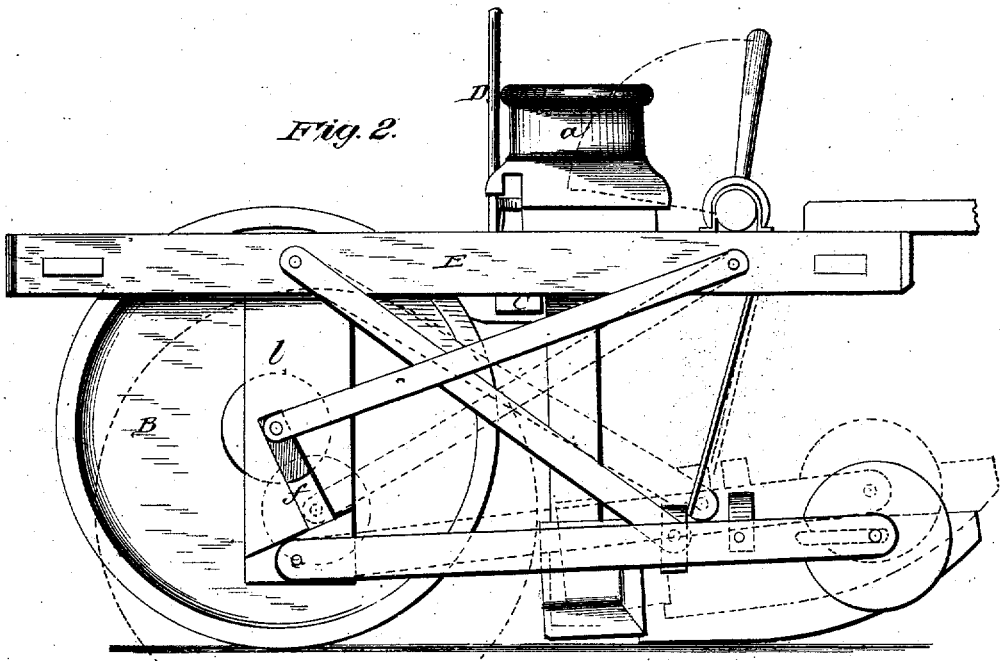
Figure 6:
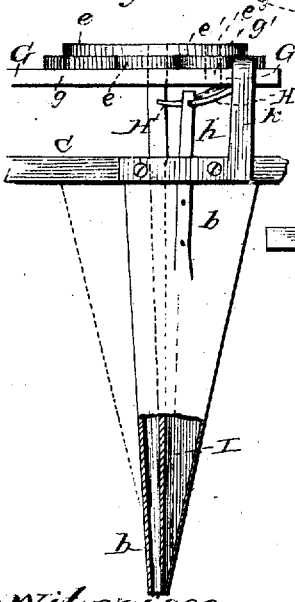
Figure 3:
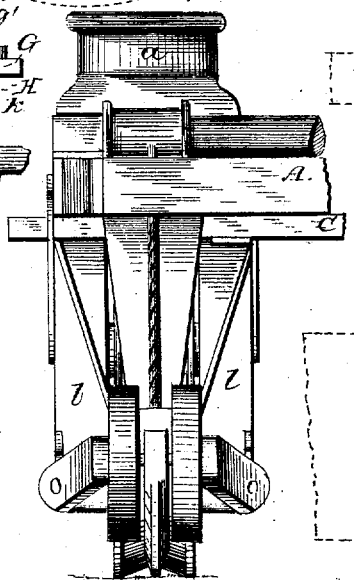
Figure 4:
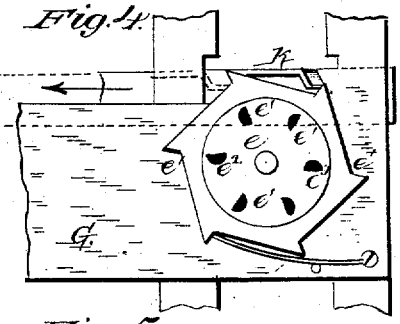
Figure 5:
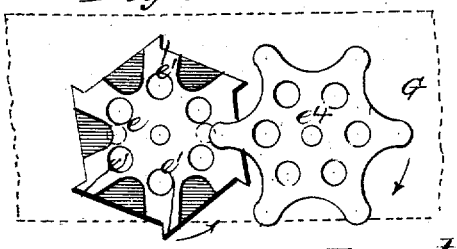

Figure 1 is a top view of the machine, showing the positions of the seed-boxes upon the frame, the runners and their attachments being double, arms and braces to hold said runners with seed-conductors, and the adjustable concave wheels. Fig. 2 is a side elevation of the machine, showing the attachment of the runners by means of bars and braces, and also one of the wheels with pendants and curved vertical slots, within which the wheel-journals operate. Fig. 3 is a front view of one side of the machine, partly in section. Fig. 4 is a top-plan view of one of the rotating seed-box bottoms, the devices for actuating the same, and other adjacent parts. Fig. 5 is a top-plan view of the rotating bottoms of the two seed-boxes arranged side by side, with cogs meshing into each other, for the purpose of a simultaneous movement of the bottoms. Fig. 6 is a rear-side view, partly in section, of one of the conductors *b*, horizontal bar C, rotating bottom *e*, spring *k*, and other parts.

This invention relates to that class of corn-planters which are drawn across the field, in operation, by draft-animals, and which are provided with a reciprocating bar, by means of which the rotating plates for measuring the seed in quantities from two or more seed-boxes are simultaneously operated; and the invention consists in constructions and in combinations of parts hereinafter described, and set forth in the claims hereto annexed.

The main frame of my machine is formed of two cross-bars, A, and three pairs of longitudinal bars, E—one pair of bars E at each end and one pair in the middle of the bars A, as shown at Fig. 1 of the drawings. Between each pair of bars E is a wheel, B, adapted to cover the seed and support the rear end of the main frame.

The journals or bearings of the wheels B work in curved vertical slots *f* in pendants *l*, which project downward below the main frame, so that they may move up or down, each independently of the other, dropping into a dead furrow or hollow, and thereby accommodating to uneven surfaces.

Upon each outside pair of bars E of the frame, and immediately forward of the wheels B, a seed-box, *a*, is located, and each seed-box *a* has a rotating bottom or seed-cup wheel, *e*, with openings or seed-cups through the same, and through which the seed passes. On the middle pair of bars E are two such seed-boxes, *a* and *a'*, for two kinds of seed, as hereinafter described.

The bottoms or seed-cup wheels *e* are rotated by means of a longitudinally-reciprocating bar, C, which extends transversely across the frame A, and is provided with a spring-pawl, *k*, at each seed-box, which engages with the cogs or ratchet-teeth *e'* on the edges or periphery of the adjacent rotating bottom or seed-cup wheel *e*.

The bar C is reciprocated by a lever, D, and as it moves in one direction it will be evident, from an inspection of the drawings, that each spring-pawl *k* will engage with a ratchet-tooth, *e'*, on the adjacent bottom or seed-cup wheel *e* and give a partial rotation to said bottom or seed-cup wheel, and as the bar C moves in an opposite direction the spring-pawls *k* will slide over the sloping sides of the ratchet-teeth *e'* and allow the bottom or seed-cup wheel *e* to remain stationary.

G is a fixed plate beneath the bottom or seed-cup wheel *e*, and has two perforations or cavities, *g g'*, through which the seed passes, only one, *g'*, of which is shown by dotted lines at Fig. 6 of the drawings.

H is a vibrating plate, pivoted beneath the plate G, its outer end forked and astride an arm, *h*, which projects upward from the bar C and vibrating tube or valve *b*, so that the plate H is moved with every movement of the vibrating discharging-tube and bar C.

I is a fixed vertical plate extending from the plate G downward between the rear forked ends of the runners or furrow-openers.

*b* is a tube inclosing the plate I, and pivoted to said plate so that it may be vibrated in a vertical plane transversely to the machine by means of the bar C, with which it is connected for the purpose. The tube *b* is shown partly broken away at its lower end at Fig. 6 of the drawings, so that its full-line position may show the tube closed at its lower end and right-hand side of the plate I, and its dotted-line position show it closed at the left-hand side of said plate. The tube *b* moves back and forth with every movement of the bar C.

As the bar C is moved toward the left hand a partial rotation will be given to each bottom or seed-cup wheel *e*, and two of the openings or seed-cups $e^2$ $e^3$, charged with seed, will be brought directly over the cavities or perforations *g g'*, respectively. The same movement of the bar C will bring the plate H beneath the opening *g'*, and thereby pocket or retain the seed therein, while the seed in the perforation or seed-cup $e^2$ will fall to the lower end of the tube *b* and be retained there by that now closed left-hand side of the tube shown by dotted lines at Fig. 6 of the drawings. A movement now of the bar C in the opposite direction to that last described will not move the bottom or seed-cup wheel *e*, (which will be held from backward movement by the detent *j*,) but will vibrate the tube *b* from the dotted-line position to the full-line position shown at Fig. 6 of the drawings, and thus allow it to discharge the seed contained at its lower end and left-hand side, and the same movement of the bar C will carry the plate H to the position shown at same figure and from beneath the pocket *g'* in the plate G, and thus allow the seed contained in the opening *g'* to fall to the lower closed end and right-hand side of the tube *b*, where it will be retained until the next forward movement of the bar C carries the tube *b* again to the dotted-line position shown at same figure, and thus releases the seed.

It will thus be seen that on the movement of the lever D to the right the bottom of each seed-box is revolved so as to open two valves or seed-cups, allowing one charge of seed to drop into the tube or conductor and one to drop into the pocket at the top of the tube or conductor. As the lever is moved to the left the seed that fell into the conductor is deposited in the ground, and the charge which was in the pocket at the top of the conductor now falls into the conductor, and is there held until the next movement of the lever to the right. It will be observed that at each movement of the lever to the right or left a charge of seed is passed out of the conductor to the ground.

The rotary bottom or seed-wheel *e* of the central pair of seed-boxes, *a a'*, is operated as hereinbefore described, but the other, $e^4$, is geared with its fellow *e*, and receives motion therefrom, as shown at Fig. 5 of the drawings.

What I claim as new, and desire to secure by Letters Patent, is—

1. In a corn-planting machine, the combination, with an actuating-bar, C, and a discharging valve or tube adapted to be moved by every throw of said bar C, of a seed-cup wheel adapted to be moved by every alternate throw of said bar.

2. In combination with an actuating-bar, C, a seed-cup wheel adapted to be moved by every alternate throw of said bar, and a slide, H, adapted to hold or retain a charge of seed received when the seed-cup wheel was moved, and to discharge said charge of seed when the actuating-bar is moved to move the slide H and while the seed-cup wheel is at rest.

3. In combination with an intermittingly-rotating seed-cup wheel, in which two seed-cups are brought over the discharging-tube at every movement of said seed-cup wheel, a slide adapted to hold the seed of one seed-cup while another discharges its seed, and to be moved from beneath the seed-cup which it closes below, to allow said seed-cup to discharge its contained seed while the seed-cup wheel is at rest.

4. In combination with the intermittingly-rotating seed-cup wheel and bar C, adapted to act upon it at alternate throws of the bar C, the sliding seed-retainer H and discharging-tube *b*, whereby the slide H and tube *b* move at every throw of the bar C, and the seed-cup wheel at every alternate throw thereof.

5. In combination with a seed-cup wheel, an actuating-bar, C, adapted to give motion to said seed-cup wheel at every alternate throw of the actuating-bar, and adapted to actuate discharging and retaining valves so as to deliver a charge of seed into the ground at every throw of the bar C.

6. In combination with a seed-cup wheel, an actuating-lever, D, and bar C, adapted to give motion to said seed-cup wheel at every alternate throw of the actuating-lever and bar, and adapted to actuate discharging and retaining valves so as to deliver a charge of seed into the ground at every throw of the lever D and bar C.

7. In a corn-planter, in combination with slotted pendants from the frame, wheels with bearings in said slots, to adapt said wheels to rise and fall independently of each other, substantially as and for the purpose specified.

8. In combination with a slide, C, and an intermittingly-rotating seed-cup wheel, $e^4$, an intermediate wheel, *e*, actuated by the slide C, and adapted to impart movement to said seed-cup wheel $e^4$ by gear-connection therewith, substantially as and for the purpose specified.

In testimony that I claim the foregoing I have hereunto set my hand this 8th day of October, 1879.

ALBERT H. FESSENDEN.

Witnesses:
I. S. PERKINS,
W. B. RICHARDS.